(12) United States Patent
    Narita

(10) Patent No.: US 11,561,631 B2
(45) Date of Patent: Jan. 24, 2023

(54) PRECURSOR FILM, SUBSTRATE WITH PLATED LAYER, CONDUCTIVE FILM, TOUCH PANEL SENSOR, TOUCH PANEL, METHOD FOR PRODUCING CONDUCTIVE FILM, AND COMPOSITION FOR FORMING PLATED LAYER

(71) Applicant: FUJIFILM Corporation, Tokyo (JP)

(72) Inventor: Takeshi Narita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/015,873

(22) Filed: Sep. 9, 2020

(65) Prior Publication Data

US 2020/0409488 A1    Dec. 31, 2020

Related U.S. Application Data

(63) Continuation of application No. PCT/JP2019/003930, filed on Feb. 5, 2019.

(30) Foreign Application Priority Data

Mar. 26, 2018  (JP) .............................. JP2018-058515

(51) Int. Cl.
    *G06F 3/041*      (2006.01)
    *C08F 220/56*    (2006.01)
    *C08F 279/06*    (2006.01)
    *C23C 18/18*     (2006.01)
    *C23C 18/31*     (2006.01)

(52) U.S. Cl.
    CPC ............ *G06F 3/041* (2013.01); *C08F 220/56* (2013.01); *C08F 279/06* (2013.01); *C23C 18/18* (2013.01); *C23C 18/31* (2013.01)

(58) Field of Classification Search
    CPC ...... C08F 220/56; C08F 279/06; C23C 18/18; C23C 18/31; G06F 3/041
    See application file for complete search history.

(56) References Cited

U.S. PATENT DOCUMENTS

| 2008/0119581 | A1 | 5/2008  | Takanashi et al. |
| 2010/0323174 | A1 | 12/2010 | Nagasaki et al.  |
| 2017/0306197 | A1 | 10/2017 | Shimokawa et al. |

(Continued)

FOREIGN PATENT DOCUMENTS

| CN | 107383275 A | 11/2017 |
| CN | 107429400 A | 12/2017 |

(Continued)

OTHER PUBLICATIONS

International Search Report issued in PCT/JP2019/003930; dated May 14, 2019.

(Continued)

*Primary Examiner* — James C Goloboy
(74) *Attorney, Agent, or Firm* — Studebaker & Brackett PC

(57) ABSTRACT

The present invention provides a precursor film for producing a conductive film, the precursor film including: a substrate; and a plated layer precursor layer disposed on the substrate, in which the plated layer precursor layer includes a polyfunctional monomer, a monofunctional monomer, and a polymer which has a functional group interacting with a plating catalyst or a precursor of the plating catalyst and has a polymerizable functional group.

13 Claims, 2 Drawing Sheets

(56) References Cited

U.S. PATENT DOCUMENTS

| | | | |
|---|---|---|---|
| 2018/0015697 A1 | 1/2018 | Ichiki | |
| 2018/0046284 A1* | 2/2018 | Higashi | ............... C23C 18/1605 |
| 2019/0001645 A1 | 1/2019 | Narita | |
| 2019/0010608 A1 | 1/2019 | Higashi et al. | |
| 2019/0029111 A1 | 1/2019 | Matsuoka et al. | |

FOREIGN PATENT DOCUMENTS

| | | | | |
|---|---|---|---|---|
| CN | 107849397 | A | 3/2018 | |
| CN | 108884568 | A | 11/2018 | |
| JP | 2012-214872 | A | 11/2012 | |
| JP | 2012214872 | A * | 11/2012 | |
| JP | 5486536 | B2 | 5/2014 | |
| JP | 2017-057280 | A | 3/2017 | |
| TW | 201802603 | A | 1/2018 | |
| TW | 201806457 | A | 2/2018 | |
| WO | 2006/080178 | A1 | 8/2006 | |
| WO | 2008/050631 | A1 | 5/2008 | |
| WO | 2016/159136 | A1 | 10/2016 | |
| WO | WO-2016194781 | A1 * | 12/2016 | ............. B32B 15/04 |
| WO | 2018/034291 | A1 | 2/2018 | |

OTHER PUBLICATIONS

International Preliminary Report on Patentability and Written Opinion issued in PCT/JP2019/003930; dated Oct. 8, 2020.
Kogi No. 2013-502654.
"Hansen Solubility Parameters: A User's Handbook, Second Edition" (written by Charles M. Hansen, CRC Press, Jul. 15, 2007)]and ["Hansen Solubility Parameters in Practice (HSPiP)" (<https://hansen-solubility.com/>).
An Office Action mailed by China National Intellectual Property Administration dated Feb. 28, 2022, which corresponds to Chinese Application No. 201980020653.7 and is related to U.S. Appl. No. 17/015,873 with English language translation.
An Office Action; "Notice of Reasons for Refusal," mailed by the Japanese Patent Office dated Sep. 14, 2021, which corresponds to Japanese Patent Application No. 2020-510345 and is related to U.S. Appl. No. 17/015,873 with English translation.
An Office Action mailed by Taiwanese Patent Office dated Jun. 24, 2022, which corresponds to Taiwanese Application No. 108106346 and is related to U.S. Appl. No. 17/015,873; with English language translation.

* cited by examiner

PRECURSOR FILM, SUBSTRATE WITH PLATED LAYER, CONDUCTIVE FILM, TOUCH PANEL SENSOR, TOUCH PANEL, METHOD FOR PRODUCING CONDUCTIVE FILM, AND COMPOSITION FOR FORMING PLATED LAYER

CROSS-REFERENCE TO RELATED APPLICATIONS

This application is a Continuation of PCT International Application No. PCT/JP2019/003930 filed on Feb. 5, 2019, which claims priority under 35 U.S.C. § 119(a) to Japanese Patent Application No. 2018-058515 filed on Mar. 26, 2018. The above application is hereby expressly incorporated by reference, in its entirety, into the present application.

BACKGROUND OF THE INVENTION

1. Field of the Invention

The present invention relates to a precursor film, a substrate with a plated layer, a conductive film, a touch panel sensor, a touch panel, a method for producing a conductive film, and a composition for forming a plated layer.

2. Description of the Related Art

A conductive film (substrate with a metal layer) in which a metal layer (preferably a patterned metal layer) is disposed on a substrate is used for various applications. For example, in recent years, with an increase in mounting rate of a touch panel on a mobile phone, a portable game device, or the like, a demand for a conductive film used for an electrostatic capacitance touch sensor capable of performing multi-point detection has been rapidly increased.

Various methods for producing a conductive film have been proposed.

For example, WO2018/034291A discloses a substrate with a plated layer including a substrate, and a plated layer disposed on the substrate, in which the plated layer is obtained by curing a composition for forming a plated layer, the composition including an amide compound selected from the group consisting of a polyfunctional acrylamide having a polyoxyalkylene group and a polyfunctional methacrylamide having a polyoxyalkylene group, and a polymer having a functional group which interacts with a plating catalyst or a precursor of the plating catalyst (claims 1, 7, and 8); and a conductive film including the substrate with the plated layer, and a metal layer disposed on the plated layer of the substrate with the plated layer (claim 11).

In addition, WO2016/159136A discloses a film with a plated layer precursor layer including a substrate, and a plated layer precursor layer formed on the substrate, in which the plated layer precursor layer is formed of a composition for forming a plated layer including a non-polymerizable polymer having a group capable of interacting with a metal ion, a polyfunctional monomer having two or more polymerizable functional groups, a monofunctional monomer, and a polymerization initiator (claims 1 and 9); a substrate with a patterned plated layer in which the plated layer precursor layer in the film with a plated layer precursor layer is cured in a pattern shape by energy application to form a patterned plated layer (claim 11); and a conductive film obtained by laminating a metal layer on the patterned plated layer of the substrate with a patterned plated layer (claim 12).

SUMMARY OF THE INVENTION

On the other hand, recently, a conductive film having a three-dimensional shape has been demanded.

For example, in order to improve operability, a touch panel in which a touch surface has a three-dimensional shape such as a curved surface has been demanded, and the conductive film having a three-dimensional shape is used for a touch panel sensor included in such a touch panel.

The present inventors have been attempted to produce a conductive film having a three-dimensional shape using the substrate with a plated layer disclosed in WO2018/034291A. However, stretchability of the plated layer is not sufficient, and it is difficult to deform the plated layer into a desired shape.

Next, the present inventors have been attempted to produce a conductive film having a three-dimensional shape using the film with a plated layer precursor layer disclosed in WO2016/159136A. However, the sensitivity of the plated layer precursor layer is low, and it is necessary to increase the exposure dose for curing.

In view of the above-described circumstances, an object of the present invention is to provide a precursor film for producing a conductive film, in which the sensitivity of a plated layer precursor layer is good, less energy is required for curing, and stretchability of a plated layer obtained by curing a plated layer precursor layer is excellent.

Another object of the present invention is to provide a substrate with a plated layer, a conductive film, a touch panel sensor, a touch panel, a method for producing a conductive film, and a composition for forming a plated layer.

As a result of extensive studies on the above-described problems, the present inventors have found that the above-described problems can be solved by using at least one polyfunctional monomer selected from the group consisting of a polyfunctional acrylamide monomer and a polyfunctional methacrylamide monomer, a monofunctional monomer, and a polymer which has a functional group interacting with a plating catalyst or a precursor of the plating catalyst and has a polymerizable functional group.

That is, the present inventors have found that the above-described problems can be solved by the following configurations.

[1] A precursor film for producing a conductive film, the precursor film comprising:
  a substrate; and
  a plated layer precursor layer disposed on the substrate,
  in which the plated layer precursor layer includes at least one polyfunctional monomer selected from the group consisting of a polyfunctional acrylamide monomer and a polyfunctional methacrylamide monomer, a monofunctional monomer, and a polymer which has a functional group interacting with a plating catalyst or a precursor of the plating catalyst and has a polymerizable functional group.

[2] The precursor film according to [1],
  in which an absolute value of a difference between a Hansen solubility parameter of the monofunctional monomer and a Hansen solubility parameter of the polymer which has a functional group interacting with a plating catalyst or a precursor of the plating catalyst and has a polymerizable functional group is 6.0 $MPa^{0.5}$ or less.

[3] The precursor film according to [1] or [2],
  in which the monofunctional monomer has a functional group which interacts with a plating catalyst or a precursor of the plating catalyst.

[4] The precursor film according to any one of [1] to [3],
in which the polymer which has a functional group interacting with a plating catalyst or a precursor of the plating catalyst and has a polymerizable functional group is a polymer having a repeating unit derived from a conjugated diene compound and a repeating unit derived from an unsaturated carboxylic acid or a derivative of the unsaturated carboxylic acid.

[5] The precursor film according to any one of [1] to [4],
in which the polyfunctional monomer is a compound represented by Formula (100),

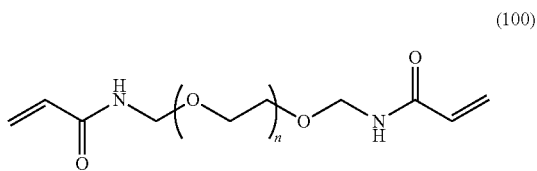

here, in Formula (100), n is an integer of 1 or more.

[6] The precursor film according to any one of [1] to [5], further comprising:
a primer layer between the substrate and the plated layer precursor layer. [7] The precursor film according to any one of [1] to [6], further comprising:
a protective film disposed on the plated layer precursor layer. [8] A substrate with a plated layer comprising:
a plated layer obtained by curing the plated layer precursor layer in the precursor film according to any one of [1] to [6].

[9] The substrate with a plated layer according to [8],
in which the plated layer is disposed in a pattern shape.

[10] The substrate with a plated layer according to [8] or [9],
in which the substrate has a three-dimensional shape.

[11] A conductive film comprising:
the substrate with a plated layer according to any one of [8] to [10]; and
a metal layer disposed on the plated layer in the substrate with a plated layer.

[12] A touch panel sensor comprising:
the conductive film according to [11].

[13] A touch panel comprising:
the touch panel sensor according to [12].

[14] A method for producing a conductive film, the method comprising:
a step of exposing the precursor film according to any one of [1] to [6] to light;
a step of developing the exposed film;
a step of molding the developed film; and
a step of plating the molded film.

[15] A composition for forming a plated layer, the composition comprising:
at least one polyfunctional monomer selected from the group consisting of a polyfunctional acrylamide monomer and a polyfunctional methacrylamide monomer;
a monofunctional monomer; and
a polymer which has a functional group interacting with a plating catalyst or a precursor of the plating catalyst and has a polymerizable functional group.

[16] The composition for forming a plated layer according to [15],
in which an absolute value of a difference between a Hansen solubility parameter of the monofunctional monomer and a Hansen solubility parameter of the polymer which has a functional group interacting with a plating catalyst or a precursor of the plating catalyst and has a polymerizable functional group is 6.0 MPa$^{0.5}$ or less.

[17] The composition for forming a plated layer according to [15] or [16],
in which the monofunctional monomer has a functional group which interacts with a plating catalyst or a precursor of the plating catalyst.

[18] The composition for forming a plated layer according to any one of [15] to [17]
in which the polymer which has a functional group interacting with a plating catalyst or a precursor of the plating catalyst and has a polymerizable functional group is a polymer having a repeating unit derived from a conjugated diene compound and a repeating unit derived from an unsaturated carboxylic acid or a derivative of the unsaturated carboxylic acid.

[19] The composition for forming a plated layer according to any one of [15] to [18],
in which the polyfunctional monomer is a compound represented by Formula (100),

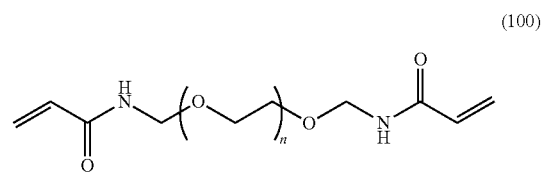

here, in Formula (100), n is an integer of 1 or more.

According to the present invention, it is possible to provide a precursor film for producing a conductive film, in which the sensitivity of a plated layer precursor layer is good, less energy is required for curing, and stretchability of a plated layer obtained by curing a plated layer precursor layer is excellent.

In addition, according to the present invention, it is possible to provide a substrate with a plated layer, a conductive film, a touch panel sensor, a touch panel, a method for producing a conductive film, and a composition for forming a plated layer.

DESCRIPTION OF THE PREFERRED EMBODIMENTS

Figure 1:
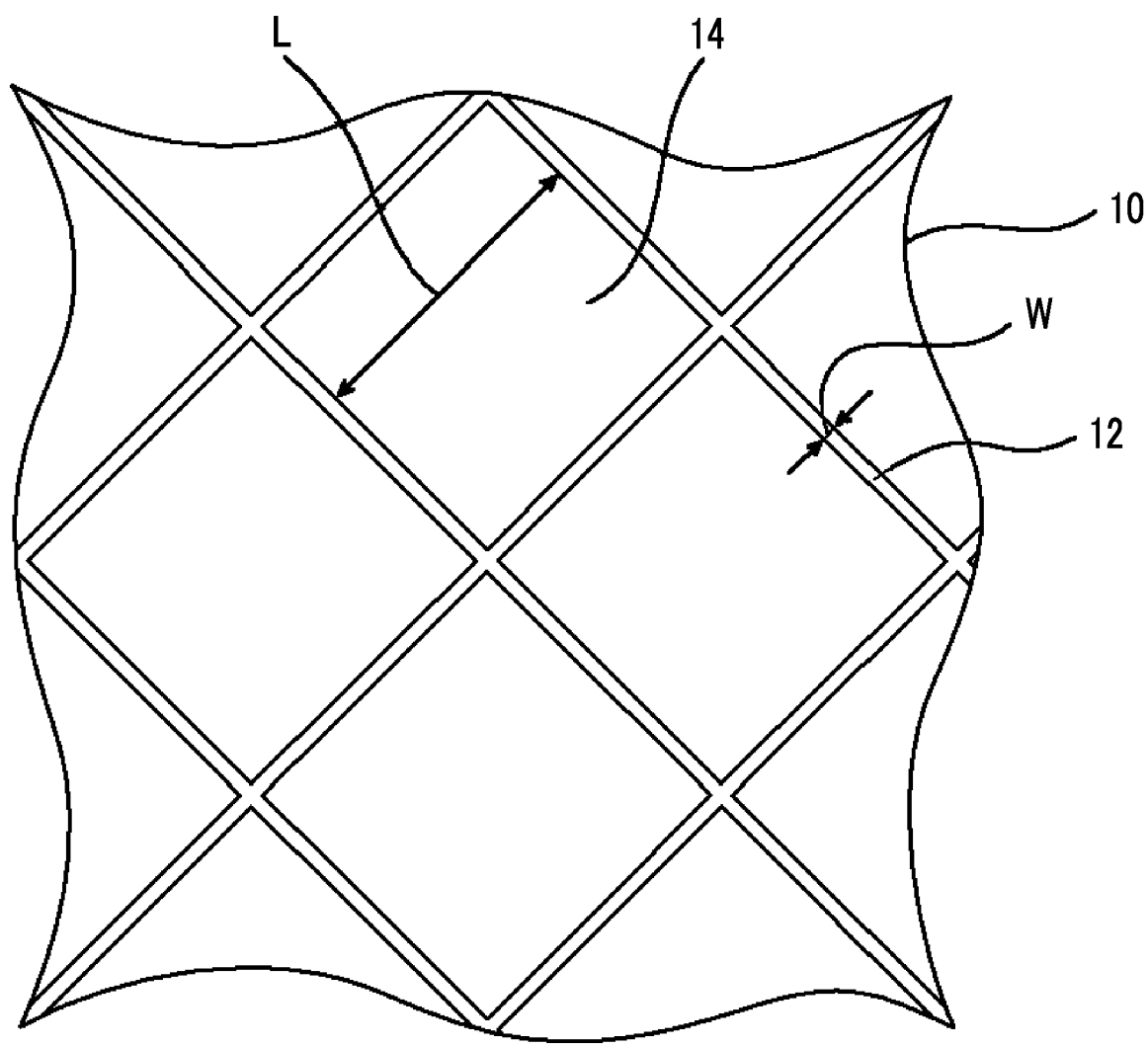
FIG. 1 is a top view of a substrate having a mesh-shaped plated layer.

Hereinafter, the present invention will be described in detail.

In the present specification, the numerical range expressed using "to" means a range including numerical values described before and after "to" as a lower limit value and an upper limit value, respectively. In addition, the drawings in the present invention are schematic views for facilitating the understanding of the invention, and the relationship of the thickness of each layer, the positional relationship of each layer, or the like does not necessarily match the actual one.

As one of the features of the precursor film for producing a conductive film in an embodiment of the present invention (hereinafter, sometimes simply referred to as "the precursor film according to the embodiment of the present invention"), the point that a plated layer precursor layer includes at least one polyfunctional monomer selected from the group consisting of a polyfunctional acrylamide monomer and a polyfunctional methacrylamide monomer, a monofunctional monomer, and a polymer which has a functional group interacting with a plating catalyst or a precursor of the plating catalyst and has a polymerizable functional group is exemplified.

By using a monofunctional monomer, stretchability of a plated layer is improved, and moldability of a substrate with a plated layer is sufficient. The reason is considered that, in a case where the monofunctional monomer is present, it is possible to increase the molecular weight of a part between crosslinking points in the plated layer and improve stretchability of the plated layer.

Furthermore, by using a polymer (hereinafter, sometimes simply referred to as a "polymerizable polymer") which has a functional group interacting with a plating catalyst or a precursor of the plating catalyst and has a polymerizable functional group, the plated layer precursor layer can be cured with a smaller amount of energy. The reason is considered that the polymerizable functional group included in the polymerizable polymer improves the sensitivity of the plated layer precursor layer.

In addition, in a case where the absolute value of a difference between the Hansen solubility parameter of the monofunctional monomer and the Hansen solubility parameter of the polymerizable polymer is 6.0 $MPa^{0.5}$ or less, platability of the plated layer is improved. The reason is considered that, by improving compatibility of the monofunctional monomer with the polymerizable polymer, a surface of the plated layer is improved in that plating depositability on the surface of the plated layer is improved.

In addition, by using the monofunctional monomer and the polymerizable polymer in combination, storability of the plated layer precursor layer and the plated layer is improved. The plated layer precursor layer and the plated layer have higher hydrophilicity than ordinary resists and are easily affected by the amount of moisture included in the layers. Therefore, in an absolutely dried plated layer precursor layer, the sensitivity in a case of exposure may be lowered so that more energy is required for curing, or the solubility in a case of development may be lowered so that the removal of unnecessary plated layer precursor layer is difficult. In addition, in an absolutely dried plated layer, plating depositability on the surface of the plated layer is not ensured so that platability is reduced. The monofunctional monomer functions as a plasticizer, and it is possible to perform good patterning even with a plated layer precursor layer aged.

Precursor Film for Producing Conductive Film

The precursor film for producing a conductive film in an embodiment of the present invention (hereinafter, sometimes simply referred to as "the precursor film according to the embodiment of the present invention") includes a substrate, and a plated layer precursor layer disposed on the substrate.

Substrate

The type of substrate is not particularly limited as long as the substrate has two main surfaces and supports a patterned plated layer described later. As the substrate, an insulating substrate is preferable, and more specifically, a resin substrate, a ceramic substrate, a glass substrate, or the like can be used.

Examples of the material of the resin substrate include polyethylene terephthalate, polyethylene naphthalate, polyether sulfone, a polyacrylic resin, a polyurethane-based resin, polyester, polycarbonate, polysulfone, polyamide, polyarylate, polyolefin, a cellulose-based resin, polyvinyl chloride, and a cycloolefin-based resin. Among these, a polyacrylic resin or polycarbonate is preferable.

The thickness (mm) of the substrate is not particularly limited, but from the viewpoint of the balance between handleability and thickness reduction, is preferably 0.05 to 2 mm and more preferably 0.1 to 1 mm.

Plated Layer Precursor Layer and Composition for Forming Plated Layer

The plated layer precursor layer includes at least one polyfunctional monomer (hereinafter, sometimes simply referred to as a "polyfunctional monomer") selected from the group consisting of a polyfunctional acrylamide monomer and a polyfunctional methacrylamide monomer, the monofunctional monomer, the polymerizable polymer.

In the precursor film according to the embodiment of the present invention, the plated layer precursor layer is formed of a composition for forming a plated layer described later. The method of forming the plated layer precursor layer on the substrate will be described later.

In the present invention, the composition for forming a plated layer includes the polyfunctional monomer, the monofunctional monomer, and the polymerizable polymer.

Hereinafter, respective components included in the plated layer precursor layer and the composition for forming a plated layer will be described.

Polyfunctional Monomer

The polyfunctional monomer is at least one monomer selected from the group consisting of a polyfunctional acrylamide monomer and a polyfunctional methacrylamide monomer.

The polyfunctional acrylamide monomer includes two or more acrylamide groups. The number of acrylamide groups in the polyfunctional acrylamide monomer is not particularly limited, but is preferably 2 to 10, more preferably 2 to 5, and still more preferably 2.

The polyfunctional methacrylamide monomer includes two or more methacrylamide groups. The number of methacrylamide groups in the polyfunctional methacrylamide monomer is not particularly limited, but is preferably 2 to 10, more preferably 2 to 5, and still more preferably 2.

The acrylamide group and the methacrylamide group are groups respectively represented by Formula (A) and Formula (B).

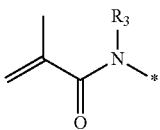

(B)

The definition of $R_3$ in Formula (A) and Formula (B) is the same as the definition of $R_3$ in Formula (1) described later.

It is preferable that the polyfunctional acrylamide monomer and the polyfunctional methacrylamide monomer respectively has a polyoxyalkylene group.

The polyoxyalkylene group is a group having an oxyalkylene group as a repeating unit. The polyoxyalkylene group is preferably a group represented by Formula (C).

$$-(A-O)_m-$$ Formula (C)

A represents an alkylene group. The number of carbon atoms in the alkylene group is not particularly limited, but is preferably 1 to 4 and more preferably 2 or 3. For example, in a case where A is an alkylene group having 1 carbon atom, -(A-O)— represents an oxymethylene group (—CH$_2$—), in a case where A is an alkylene group having 2 carbon atoms, -(A-O)— represents an oxyethylene group (—CH$_2$CH$_2$O—), and in a case where A is an alkylene group having 3 carbon atoms, -(A-O)— represents an oxypropylene group (—CH$_2$CH(CH$_3$)O—, —CH(CH$_3$)CH$_2$O—, or —CH$_2$CH$_2$CH$_2$O—). The alkylene group may be linear or branched.

m represents the number of repetitions of the oxyalkylene group, and represents an integer of 2 or more. The number of repetitions is not particularly limited, but is preferably 2 to 10 and more preferably 2 to 6.

The number of carbon atoms of the alkylene groups in a plurality of oxyalkylene groups may be the same or different. For example, Formula (C) includes a plurality of repeating units represented by -(A-O)—, and the number of carbon atoms in the alkylene group of each repeating unit may be the same or different. For example, in -(A-O)$_m$—, an oxymethylene group and an oxypropylene group may be included.

In addition, in a case of including a plurality of kinds of oxyalkylene groups, the order of bonding these oxyalkylene groups is not particularly limited, and may be a random type or a block type.

Among these, from the viewpoint that stretchability of the plated layer is more excellent, examples of a suitable aspect of the polyfunctional monomer include a compound represented by Formula (1).

The definitions of A and m in Formula (1) are the same as the definitions of A and m in Formula (C) described above.

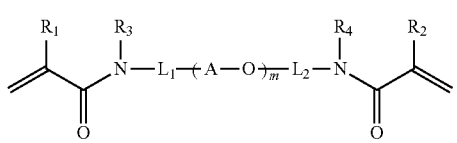

(1)

In Formula (1), $R_1$ and $R_2$ each independently represent a hydrogen atom or a methyl group.

$R_3$ and $R_4$ each independently represent a hydrogen atom or a substituent. The type of the substituent is not particularly limited, and examples thereof include known substituents (for example, an aliphatic hydrocarbon group, an aromatic hydrocarbon group, and the like, which may include a heteroatom; more specifically, an alkyl group, an aryl group, and the like).

$L_1$ and $L_2$ each independently represent a single bond or a divalent linking group.

The type of the divalent linking group is not particularly limited, and examples thereof include a divalent hydrocarbon group (which may be a divalent saturated hydrocarbon group or a divalent aromatic hydrocarbon group; the divalent saturated hydrocarbon group may be any of linear forms, branched forms, or cyclic forms, and preferably has 1 to 20 carbon atoms, and examples thereof include an alkylene group; the divalent aromatic hydrocarbon group preferably has 5 to 20 carbon atoms, and examples thereof include a phenylene group; other than these groups, the divalent hydrocarbon group may be an alkenylene group or an alkynylene group), a divalent heterocyclic group, —O—, —S—, —SO$_2$—, —NR$_{10}$—, —CO— (—C(=O)—), —COO— (—C(=O)O—), —NR$_{10}$—CO—, —CO—NR$_{10}$—, —SO$_3$—, —SO$_2$NR$_{10}$—, and a group of a combination of two or more kinds thereof. Here, $R_{10}$ represents a hydrogen atom or an alkyl group (preferably having 1 to 10 carbon atoms).

A hydrogen atom in the divalent linking group may be substituted with another substituent such as a halogen atom.

Examples of a suitable aspect of the compound represented by Formula (1) include a compound represented by Formula (2).

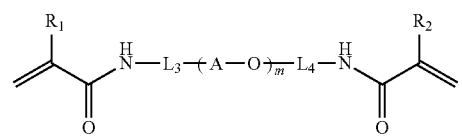

(2)

The definitions of $R_1$, $R_2$, A, and m in Formula (2) are the same as the definitions of respective groups in Formula (1).

$L_3$ and $L_4$ each independently represent —O—, an alkylene group having 1 to 4 carbon atoms, a group represented by Formula (D), or a divalent linking group of a combination of these groups.

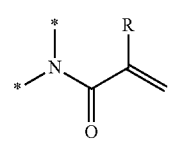

(D)

In Formula (D), R represents a hydrogen atom or a methyl group.

*represents a bonding site.

As the polyfunctional monomer, a compound represented by Formula (100) is preferable.

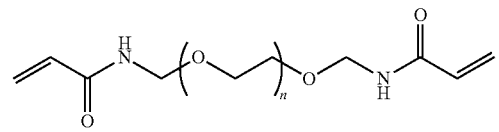

(100)

Here, in Formula (100), n is an integer of 1 or more. Among these, n is preferably 1 to 5 and more preferably 1 to 3.

Various commercially available products can be used as the polyfunctional monomer, and the polyfunctional monomer can be synthesized according to the method described in Kogi No. 2013-502654.

Specific Examples of Polyfunctional Monomer

Specific examples of the polyfunctional monomer include bifunctional acrylamide (which can be synthesized according to paragraph 0187 of Kokai Giho (Journal of Technical Disclosure) 2013-502632) represented by Formula (AA), and tetrafunctional methacrylamide (which can be synthesized according to JP5486536B) represented by Formula (BB), but the polyfunctional monomer is not limited thereto.

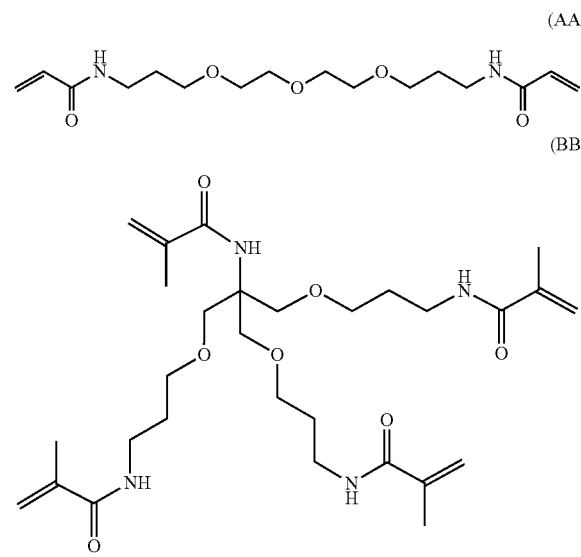

Content of Polyfunctional Monomer

The content of the polyfunctional monomer in the plated layer precursor layer (or the composition for forming a plated layer) is not particularly limited, and is usually 10% to 90% by mass with respect to the total solid content. However, from the viewpoint that tackiness of the plated layer precursor layer described later is further suppressed, the content of the polyfunctional monomer, with respect to the total solid content, is preferably 10% to 50% by mass, and from the viewpoint that the balance between stretchability of the plated layer and plating depositability is more excellent, the content of the polyfunctional monomer is more preferably 15% to 25% by mass.

In the present specification, the solid content means components, excluding a solvent, constituting the plated layer. Even in a case where a component is liquid, the component is included in the solid content as long as the component constitutes the plated layer.

Monofunctional Monomer

The monofunctional monomer is not particularly limited as long as a compound having one polymerizable functional group.

Examples of the monofunctional monomer include a compound having an ethylenically unsaturated bond as a compound having addition polymerizability and a compound having an epoxy group as a compound having ring-opening polymerizability.

Specific examples of the monofunctional monomer include a compound having one polymerizable functional group.

The polymerizable functional group is a functional group capable of forming a chemical bond by energy application, and examples thereof include a radical-polymerizable functional group and a cation-polymerizable functional group. Among these, from the viewpoint of more excellent reactivity, a radical-polymerizable functional group is preferable. Examples of the radical-polymerizable functional group include an unsaturated carboxylic acid ester group such as an acrylic acid ester group (acryloyloxy group), a methacrylic acid ester group (methacryloyloxy group), an itaconic acid ester group, a crotonic acid ester group, an isocrotonic acid ester group, and a maleic acid ester group, a styryl group, a vinyl group, an acrylamide group, and a methacrylamide group. Among these, a methacryloyloxy group, an acryloyloxy group, a vinyl group, a styryl group, an acrylamide group, or a methacrylamide group is preferable, and an acrylamide group, a methacrylamide group, a methacryloyloxy group, an acryloyloxy group, or a styryl group is more preferable.

From the viewpoint that plating depositability on the surface of the plated layer is more excellent, it is preferable that the monofunctional monomer has a functional group (hereinafter, sometimes simply referred to as an "interacting group") which interacts with a plating catalyst or a precursor of the plating catalyst.

The interacting group means a functional group that can interact with a plating catalyst or a precursor of the plating catalyst, which are applied to the plated layer, and examples thereof include a functional group which can form an electrostatic interaction with the plating catalyst or a precursor of the plating catalyst, and a nitrogen-containing functional group, a sulfur-containing functional group, and an oxygen-containing functional group, which can form a coordination with the plating catalyst or a precursor of the plating catalyst.

Examples of the interacting group include nitrogen-containing functional groups such as an amino group, an amide group, an imide group, a urea group, a tertiary amino group, an ammonium group, an amidino group, a triazine group, a triazole group, a benzotriazole group, an imidazole group, a benzimidazole group, a quinoline group, a pyridine group, a pyrimidine group, a pyrazine group, a quinazoline group, a quinoxaline group, a purine group, a piperidine group, a piperazine group, a pyrrolidine group, a pyrazole group, an aniline group, a group including an alkylamine structure, a group including an isocyanuric structure, a nitro group, a nitroso group, an azo group, a diazo group, an azide group, a cyano group, and a cyanate group; oxygen-containing functional groups such as an ether group, a polyoxyalkylene group, a hydroxyl group, a phenolic hydroxyl group, a carboxylic acid group, a carbonate group, a carbonyl group, an ester group, a group including an N-oxide structure, a group including an S-oxide structure, and a group including an N-hydroxy structure; sulfur-containing functional groups such as a thiophene group, a thiol group, a thiourea group, a thiocyanuric acid group, a benzthiazole group, a mercaptotriazine group, a thioether group, a thioxy group, a sulfoxide group, a sulfonic acid group, a sulfite group, a group including a sulfoximine structure, a group including a sulfoxonium salt structure, and a group including a sulfonic acid ester structure; phosphorus-containing functional groups such as a phosphate group, a phosphoramide group, a phosphine group, and a group including a phosphoric acid ester structure; and groups including a halogen atom such as a chlorine atom and a bromine atom. In a case of a functional group capable of having a salt structure, a salt thereof can also be used.

Among these, from the viewpoint of high polarity and high adsorption ability to the plating catalyst or a precursor of the plating catalyst, an ionic polar group such as a carboxylic acid group, a sulfonic acid group, a phosphoric acid group, and a boronic acid group, or a polyoxyalkylene group is preferable.

As the monofunctional monomer, from the viewpoint that stretchability of the plated layer and plating depositability on the plated layer are more excellent, a compound represented by Formula (3) is preferable.

Formula (3)

Y represents a polymerizable functional group. The polymerizable functional group is as defined above.

La represents a single bond or a divalent linking group. The definition of the divalent linking group is the same as the definition of the divalent linking group represented by $L_1$ and $L_2$ in Formula (1).

Z represents an interacting group. The interacting group is as defined above.

Molecular Weight of Monofunctional Monomer

The molecular weight of the monofunctional monomer is not particularly limited, but is preferably 50 to 400 and still more preferably 70 to 250.

Specific Examples of Monofunctional Monomer

Specific examples of the monofunctional monomer include β-carboxyethyl acrylate, 4-hydroxybutyl acrylate, BLEMMER® AE-200 (polyethylene glycol monoacrylate; manufactured by NOF CORPORATION), ethoxyethoxyethyl acrylate, N-t-butyl acrylamide, isopropyl acrylamide, diacetone acrylamide, hydroxymethyl acrylamide, butoxymethyl acrylamide, and 2-acrylamido-2-methylpropanesulfonic acid, but the monofunctional monomer is not limited thereto.

Content of Monofunctional Monomer

From the viewpoint of the balance between strength of the plated layer and plating suitability, the content of the monofunctional monomer in the plated layer precursor layer (or the composition for forming a plated layer) is preferably 10 to 1000 parts by mass, more preferably 15 to 500 parts by mass, still more preferably 30 to 200 parts by mass, and particularly preferably 100 to 150 parts by mass with respect to 100 parts by mass of the total of the polyfunctional monomer and the polymerizable polymer.

Polymerizable Polymer

The polymerizable polymer is a polymer having an interacting group and a polymerizable functional group.

The interacting group is as defined above.

Among these, from the viewpoint of high polarity and high adsorption ability to the plating catalyst or a precursor of the plating catalyst, an ionic polar group such as a carboxylic acid group, a sulfonic acid group, a phosphoric acid group, and a boronic acid group, or a cyano group is preferable, and a carboxylic acid group or a cyano group is more preferable.

The polymerizable polymer may have two or more kinds of interacting groups.

It is preferable that the polymerizable polymer includes a repeating unit having the interacting group.

Examples of one suitable aspect of the repeating unit having the interacting group include a repeating unit represented by Formula (E).

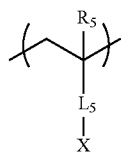

(E)

In Formula (E), $R_5$ represents a hydrogen atom or an alkyl group (for example, a methyl group, an ethyl group, and the like).

$L_5$ represents a single bond or a divalent linking group. The definition of the divalent linking group is the same as the definition of the divalent linking group represented by $L_1$ and L2 in Formula (1).

X represents an interacting group. The interacting group is as defined above.

Examples of another suitable aspect of the repeating unit having the interacting group include a repeating unit derived from an unsaturated carboxylic acid or a derivative of the unsaturated carboxylic acid.

The unsaturated carboxylic acid is an unsaturated compound having a carboxylic acid group (—COOH group). Examples of the derivative of the unsaturated carboxylic acid include an anhydride of the unsaturated carboxylic acid, a salt of the unsaturated carboxylic acid, and a monoester of the unsaturated carboxylic acid.

Examples of the unsaturated carboxylic acid include acrylic acid, methacrylic acid, crotonic acid, isocrotonic acid, maleic acid, fumaric acid, itaconic acid, and citraconic acid.

The content of the repeating unit having the interacting group in the polymerizable polymer is not particularly limited, but from the viewpoint of the balance between stretchability of the plated layer and plating depositability, is preferably 1% to 90% by mole and more preferably 30% to 70% by mole with respect to all repeating units.

Polymerizable Functional Group

The polymerizable functional group is a functional group capable of forming a chemical bond by energy application, and examples thereof include a radical-polymerizable functional group and a cation-polymerizable functional group. Among these, from the viewpoint of more excellent reactivity, a radical-polymerizable functional group is preferable. Examples of the radical-polymerizable functional group include an alkenylene group, an unsaturated carboxylic acid ester group such as an acrylic acid ester group (acryloyloxy group), a methacrylic acid ester group (methacryloyloxy group), an itaconic acid ester group, a crotonic acid ester group, an isocrotonic acid ester group, and a maleic acid ester group, a styryl group, a vinyl group, an acrylamide group, and a methacrylamide group.

The polymerizable group may be included in either of the main chain or side chain of the polymerizable polymer. For example, the alkenylene group may be included in the main chain.

Suitable Aspect of Polymerizable Polymer

From the viewpoint that the plated layer is easily formed with a small amount of energy application (for example, exposure dose), examples of a suitable aspect of the polymerizable polymer include a polymer X having a repeating unit derived from a conjugated diene compound, and a repeating unit derived from an unsaturated carboxylic acid or a derivative of the unsaturated carboxylic acid.

The description of the repeating unit derived from an unsaturated carboxylic acid or a derivative of the unsaturated carboxylic acid is as described above.

The conjugated diene compound is not particularly limited as long as a compound having a molecular structure which has two carbon-carbon double bonds separated by one single bond.

Examples of the conjugated diene compound include isoprene, 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene, 2,3-dimethyl-butadiene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, and 2-p-tolyl-1,3-butadiene.

Among these, from the viewpoint that the polymer X is easily synthesized and the characteristics of the plated layer are more excellent, the repeating unit derived from the conjugated diene compound is preferably a repeating unit derived from a compound having a butadiene skeleton represented by Formula (F).

(F)

In Formula (F), $R_6$'s each independently represent a hydrogen atom, a halogen atom, or a hydrocarbon group. Examples of the hydrocarbon group include an aliphatic hydrocarbon group (for example, an alkyl group, an alkenyl group, and the like; preferably having 1 to 12 carbon atoms) and an aromatic hydrocarbon group (for example, a phenyl group, a naphthyl group, and the like). A plurality of $R_6$'s may be the same as or different from each other.

Examples of the compound (monomer having a butadiene structure) having a butadiene skeleton represented by Formula (F) include 1,3-butadiene, isoprene, 2-ethyl-1,3-butadiene, 2-n-propyl-1,3-butadiene, 2,3-dimethyl-1,3-butadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, and 2-cyano-1,3-butadiene.

The content of the repeating unit derived from the conjugated diene compound in the polymer X is preferably 25% to 75% by mole with respect to all repeating units.

The content of the repeating unit derived from the unsaturated carboxylic acid or the derivative of the unsaturated carboxylic acid in the polymer X is preferably 25% to 75% by mole with respect to all repeating units.

Weight-Average Molecular Weight of Polymerizable Polymer

The weight-average molecular weight of the polymerizable polymer is not particularly limited, but from the viewpoint of more excellent handleability, is preferably 1,000 to 1,000,000 and more preferably 2,000 to 600,000.

Specific Examples of Polymerizable Polymer

Specific examples of the polymerizable polymer include a butadiene-maleic acid copolymer which is an alternating copolymer of 1,3-butadiene and maleic acid anhydride, but the polymerizable polymer is not limited thereto.

Content of Polymerizable Polymer

The content of the polymerizable polymer in the plated layer precursor layer (or the composition for forming a plated layer) is not particularly limited, and is usually 10% to 90% by mass with respect to the total solid content. However, from the viewpoint that tackiness of the plated layer precursor layer described later is further suppressed, the content of the polymerizable polymer, with respect to the total solid content, is preferably 15% to 85% by mass, and from the viewpoint that the balance between stretchability of the plated layer and plating depositability is more excellent, the content of the polymerizable polymer is more preferably 20% to 60% by mass.

The ratio (Mass of polymerizable polymer/Total mass of polyfunctional monomer and monofunctional monomer) of the mass of the polymerizable polymer to the total mass of the polyfunctional monomer and the monofunctional monomer is not particularly limited, and is usually 0.1 to 10. However, from the viewpoint that tackiness of the plated layer precursor layer is further suppressed, the ratio is preferably 0.1 to 3.0 and more preferably 0.3 to 1.5.

δHSP

The absolute value of the difference between the Hansen solubility parameter (HSP) of the monofunctional monomer and HSP of the polymerizable polymer (in the present invention, sometimes referred to as "δHSP"; δHSP=|(HSP of monofunctional monomer)−(HSP of polymerizable polymer)|) is not particularly limited, but is preferably 12 $MPa^{0.5}$ or less, more preferably 6 $MPa^{0.5}$ or less, and still more preferably 4 $MPa^{0.5}$ or less. The lower limit is not particularly limited, but is 0 $MPa^{0.5}$.

In a case where δHSP is within the range, in the present invention, platability of the plated layer obtained by curing the plated layer precursor layer is better. The reason is considered that, by improving compatibility of the monofunctional monomer with the polymerizable polymer, a surface of the plated layer is improved in that plating depositability on the surface of the plated layer is improved.

The Hansen solubility parameter can be obtained by making reference to "Hansen Solubility Parameters: A User's Handbook, Second Edition" (written by Charles M. Hansen, CRC Press, Jul. 15, 2007), which is an official document, or calculating by "Hansen Solubility Parameters in Practice (HSPiP)" (hansen-solubility.com), which is official software.

Polymerization Initiator

In the present invention, the plated layer precursor layer (or the composition for forming a plated layer) may include a polymerization initiator. By including the polymerization initiator, the reaction between the polymerizable functional groups during an exposure treatment more efficiently proceeds.

The polymerization initiator is not particularly limited, and a known polymerization initiator (so-called photopolymerization initiator) or the like can be used. Examples of the polymerization initiator include benzophenones, acetophenones, a-aminoalkylphenones, benzoins, ketones, thioxanthones, benzyls, benzyl ketals, oxime esters, anthrones, tetramethylthiuram monosulfides, bisacylphosphine oxides, acylphosphine oxides, anthraquinones, azo compounds, and derivatives thereof.

The content of the polymerization initiator in the composition for forming a plated layer is not particularly limited, but from the viewpoint of curability of the plated layer, is preferably 0.1% to 20% by mass and more preferably 1% to 10% by mass with respect to 100% by mass of the total content of the polyfunctional monomer, the monofunctional monomer, and the polymerizable polymer.

Solvent

From the viewpoint of handleability, the composition for forming a plated layer preferably includes a solvent.

The usable solvent is not particularly limited, and examples thereof include water; an alcohol-based solvent such as methanol, ethanol, propanol, ethylene glycol, 1-methoxy-2-propanol, glycerin, and propylene glycol monomethyl ether; an acid such as acetic acid; a ketone-based solvent such as acetone, methyl ethyl ketone, and cyclohexanone; an amide-based solvent such as formamide, dimethylacetamide, and N-methylpyrrolidone; a nitrile-based solvent such as acetonitrile and propionitrile; an ester-based solvent such as methyl acetate and ethyl acetate; a carbonate-based solvent such as dimethyl carbonate and diethyl carbonate; an ether-based solvent, a glycol-based solvent, an amine-based solvent, a thiol-based solvent, and a halogen-based solvent.

Among these, an alcohol-based solvent, an amide-based solvent, a ketone-based solvent, a nitrile-based solvent, or a carbonate-based solvent is preferable.

The content of the solvent in the composition for forming a plated layer is not particularly limited, but is preferably 50% to 98% by mass and more preferably 70% to 98% by mass with respect to the total amount of the composition. In a case where the content of the solvent is within the above-described range, handleability of the composition is excellent and the layer thickness of the patterned plated layer, or the like is easily controlled.

Other Additives

The composition for forming a plated layer may include other additives (for example, a sensitizer, a curing agent, a polymerization inhibitor, an antioxidant, an antistatic agent, an ultraviolet absorbing agent, a filler, particles, a flame retardant, a surfactant, a lubricant, a plasticizer, and the like) as necessary.

Method for Producing Composition for Forming Plated Layer

The method for producing the composition for forming a plated layer is not particularly limited, and examples thereof include a known method. Examples thereof include a method of collectively mixing the above-described respective components, and a method of mixing the respective components stepwise.

Method for Producing Precursor Film

Using the above-described composition for forming a plated layer, a plated layer precursor layer can be formed on a substrate. The plated layer precursor layer is a precursor layer which is subjected to a curing treatment to be a plated layer, and is a layer in an uncured state before being subjected to the curing treatment.

As a method for producing the plated layer precursor layer, a method having the following step is preferable.

Step 1: Step of Contacting a Substrate With a Composition For Forming a Plated Layer to Form a Plated Layer Precursor Layer on the Substrate Step 1 is a step of contacting a substrate with a composition for forming a plated layer to form a plated layer precursor layer on the substrate. By performing this step, a substrate with a plated layer precursor layer, which has a substrate, and a plated layer precursor layer disposed on the substrate, is obtained.

The method of contacting the composition for forming a plated layer with the substrate is not particularly limited, and examples thereof include a method of applying the composition for forming a plated layer onto the substrate, and a method of immersing the substrate in the composition for forming a plated layer.

After contacting the composition for forming a plated layer with the substrate, as necessary, a drying treatment may be performed to remove a solvent from the plated layer precursor layer.

Substrate with Plated Layer

The substrate with a plated layer according to the embodiment of the present invention has a plated layer obtained by curing the plated layer precursor layer in the precursor film according to the embodiment of the present invention.

Using the above-described precursor film according to the embodiment of the present invention, a substrate with a plated layer can be produced. The plated layer is a layer to be subjected to a plating treatment described later, and a metal layer is formed on a surface thereof by the plating treatment.

As a method for producing the substrate with a plated layer, a method having the following step is preferable.

Step 2: Step of Forming a Plated Layer by Performing a Curing Treatment to the Plated Layer Precursor Layer in the Precursor Film Step 2 is a step of forming a plated layer by performing a curing treatment to the plated layer precursor layer.

The method of the curing treatment is not particularly limited, and examples thereof include a heating treatment and an exposure treatment (light irradiation treatment). Among these, from the viewpoint that the treatment is completed in a short time, an exposure treatment is preferable. By the curing treatment, the polymerizable group included in compounds in the plated layer precursor layer is activated so that crosslinking between the compounds occurs and curing of the layer proceeds.

In a case of performing the curing treatment (particularly, exposure treatment), a curing treatment may be performed in a pattern shape so that a desired patterned plated layer is obtained. For example, it is preferable to perform the exposure treatment using a mask having an opening portion with a predetermined shape. By performing a development treatment to the plated layer precursor layer subjected to the curing treatment in a pattern shape, a patterned plated layer is formed.

The method of the development treatment is not particularly limited, and an optimal development treatment is performed depending on the type of material to be used. Examples of a developer include an organic solvent, pure water, and an alkaline aqueous solution.

By the above method, the plated layer obtained by curing the composition for forming a plated layer is disposed on the substrate. That is, the substrate with a plated layer, which has the substrate and the plated layer disposed on the substrate, is obtained.

The average thickness of the plated layer is not particularly limited, but is preferably 0.05 to 100 µm, more preferably 0.07 to 10 µm, and still more preferably 0.1 to 3 µm.

The average thickness is an average value obtained by observing a vertical cross section of the plated layer with an electron microscope (for example, scanning electron microscope), measuring thicknesses at arbitrary 10 points, and arithmetically averaging the thicknesses.

The plated layer may be formed in a pattern shape. For example, the plated layer may be formed in a mesh shape. In FIG. 1, a mesh-shaped plated layer 12 is disposed on a substrate 10.

The size of a line width W of a fine line portion constituting a mesh of the plated layer 12 is not particularly limited, but from the viewpoint of the balance between the conductive characteristics and difficulty of visual recognition of the metal layer formed on the plated layer, is preferably 30 µm or less, more preferably 15 µm or less, still more preferably 10 µm or less, and particularly preferably 5 µm or less, and is preferably 0.5 µm or more and more preferably 1.0 µm or more.

In FIG. 1, the shape of an opening portion 14 is a rhombic shape, but the shape is not limited thereto, and may be other polygonal shapes (for example, a triangular shape, a quadrangular shape, a hexagonal shape, and a random polygonal shape). In addition, the shape of one side may be a curved shape or an arc shape, in addition to a linear shape. In a case of the arc shape, for example, two opposing sides may have an outwardly convex arc shape, and the other two opposing sides may have an inwardly convex arc shape. In addition, the shape of each side may be a wavy shape in which the outwardly convex arc and the inwardly convex arc are connected. Needless to say, the shape of each side may be a sine curve.

A length L of one side of the opening portion 14 is not particularly limited, but is preferably 1500 µm or less, more preferably 1300 µm or less, and still more preferably 1000 µm or less, and is preferably 5 µm or more, more preferably 30 µm or more, and still more preferably 80 µm or more. In a case where the length of one side of the opening portion is within the above-described range, transparency of a conductive film described later is more excellent.

The substrate with a plated layer may be deformed to be a substrate with a plated layer having a three-dimensional shape. That is, by deforming the substrate with a plated layer, a substrate with a plated layer (substrate with a plated layer having a three-dimensional shape), which has a substrate having a three-dimensional shape, and a plated layer (or a patterned plated layer) disposed on the substrate, is obtained.

As described above, the plated layer obtained by curing the composition for forming a plated layer has excellent stretchability, and the shape thereof can be deformed by following the deformation of the substrate.

The method of deforming the substrate with a plated layer is not particularly limited, and examples thereof include known methods such as vacuum molding, blow molding, free blow molding, pressure molding, vacuum-pressure molding, and hot press molding.

Figure 2:
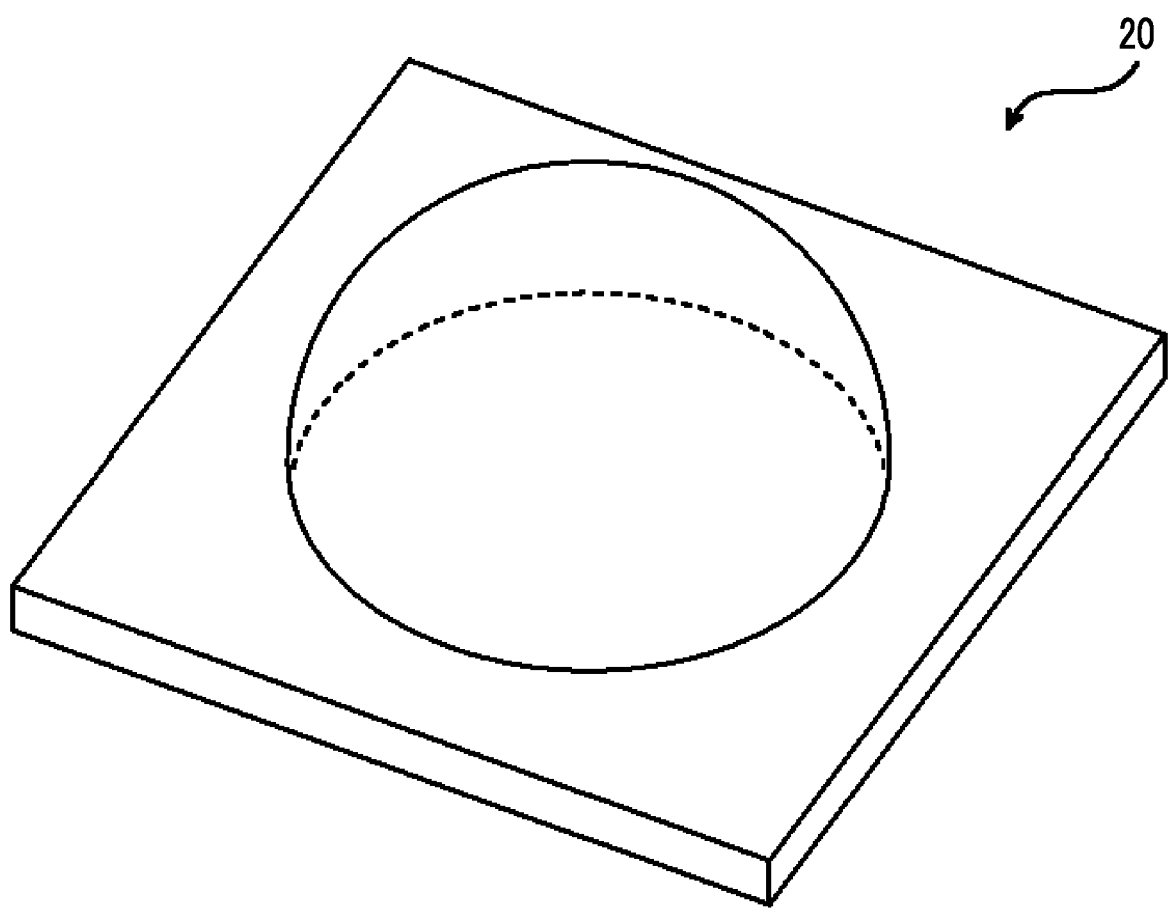
FIG. 2 is a perspective view of an embodiment of a substrate with a plated layer having a three-dimensional shape.

For example, as shown in FIG. 2, a part of the substrate with a plated layer may be deformed in a hemispherical shape to be a substrate 20 with a plated layer having a hemispherical shape. In FIG. 2, the plated layer is not shown.

The aspect in which the three-dimensional shape is applied has been described above, but the substrate with a plated layer may be subjected to a stretching treatment such as uniaxial stretching or biaxial stretching to deform the shape of the substrate with a plated layer.

The aspect in which the substrate with a plated layer is deformed has been described above, but the present invention is not limited thereto, and after deforming the substrate with a plated layer precursor layer, the step 2 may be performed to obtain a substrate with a plated layer having a three-dimensional shape.

In addition, the aspect in which the plated layer precursor layer is subjected to the curing treatment in a pattern shape to form the patterned plated layer has been described above, but the present invention is not limited thereto, and it is also possible to form a patterned plated layer by disposing the plated layer precursor layer on the substrate in a pattern shape, and subjecting the patterned plated layer precursor layer to the curing treatment. Examples of disposing the patterned plated layer precursor layer include a method of applying the composition for forming a plated layer at a predetermined position on the substrate according to a screen printing method or an inkjet method.

Conductive Film, Touch Panel Sensor, and Touch Panel

The conductive film according to the embodiment of the present invention includes the substrate with a plated layer according to the embodiment of the present invention, and a metal layer disposed on the plated layer in the substrate with a plated layer. In addition, the touch panel sensor according to the embodiment of the present invention includes the conductive film according to the embodiment of the present invention, and the touch panel according to the embodiment of the present invention includes the touch panel sensor according to the embodiment of the present invention.

The metal layer can be formed on the plated layer by subjecting the plated layer in the substrate with a plated layer to a plating treatment. In particular, in a case of disposing the plated layer on the substrate in a pattern shape, a metal layer (patterned metal layer) is formed along the pattern.

The method of forming the metal layer is not particularly limited, and for example, it is preferable to perform a step 3 of applying a plating catalyst or a precursor of the plating catalyst to the plated layer, and a step 4 of subjecting the plated layer to which the plating catalyst or a precursor of the plating catalyst is applied to a plating treatment.

Hereinafter, the procedures of the step 3 and the step 4 will be described in detail.

Step 3 is a step of applying a plating catalyst or a precursor of the plating catalyst to the plated layer. Since the plated layer includes the interacting group, the interacting group adheres (adsorbs) the applied plating catalyst or a precursor of the plating catalyst according to the function of the interacting group.

The plating catalyst or a precursor of the plating catalyst functions as a catalyst or an electrode for the plating treatment. Therefore, the type of the plating catalyst or a precursor of the plating catalyst to be used is appropriately determined depending on the type of the plating treatment.

The plating catalyst or a precursor of the plating catalyst is preferably an electroless plating catalyst or a precursor of the electroless plating catalyst.

The electroless plating catalyst is not particularly limited as long as the catalyst serves as an active nucleus in a case of electroless plating, and examples thereof include metals (substances known as a metal capable of electroless plating and having a lower ionization tendency than that of Ni) having a catalytic ability of a self-catalytic reduction reaction. Specific examples thereof include Pd, Ag, Cu, Pt, Au, and Co.

As the electroless plating catalyst, a metal colloid may be used.

An electroless plating catalyst precursor is not particularly limited as long as the precursor acts as the electroless plating catalyst by a chemical reaction, and examples thereof include ions of the metals exemplified as the electroless plating catalyst.

Examples of the method of applying the plating catalyst or a precursor of the plating catalyst to the plated layer include a method of preparing a solution in which the plating catalyst or a precursor of the plating catalyst is dispersed or dissolved in a solvent, and applying the solution onto the plated layer, and a method of immersing the substrate with a plated layer in the solution.

Examples of the solvent include water and an organic solvent.

Step 4 is a step of subjecting the plated layer to which the plating catalyst or a precursor of the plating catalyst is applied to a plating treatment.

The method of the plating treatment is not particularly limited, and examples thereof include an electroless plating treatment and an electrolytic plating treatment (electroplating treatment). In this step, the electroless plating treatment may be performed alone, or the electrolytic plating treatment may be further performed after performing the electroless plating treatment.

Hereinafter, the procedures of the electroless plating treatment and the electrolytic plating treatment will be described in detail.

The electroless plating treatment is a treatment of depositing metals by a chemical reaction using a solution in which metal ions expected to be deposited as plating are dissolved.

As the procedure of the electroless plating treatment, for example, it is preferable that a substrate with a plated layer to which the electroless plating catalyst is applied is washed with water to remove excess electroless plating catalyst, and then immersed in an electroless plating bath. As the electroless plating bath to be used, a known electroless plating bath can be used.

In a general electroless plating bath, in addition to the solvent (for example, water), metal ions for plating, a reducing agent, and an additive (stabilizer) which improves stability of the metal ions are mainly included.

In a case where the plating catalyst or a precursor of the plating catalyst which is applied to the plated layer functions as an electrode, an electrolytic plating treatment can be performed to the plated layer to which the catalyst of a precursor of the catalyst is applied.

As described above, the electrolytic plating treatment can be performed as necessary after the electroless plating treatment. In such a form, the thickness of the metal layer to be formed can be appropriately adjusted.

The aspect in which the step 3 is performed has been described above, but in a case where the plating catalyst or a precursor of the plating catalyst is included in the plated layer, the step 3 may not be performed.

By performing the above treatment, the metal layer is formed on the plated layer. That is, a conductive film, which includes the substrate with a plated layer and the metal layer disposed on the plated layer in the substrate with a plated layer, is obtained.

By disposing the patterned plated layer on the substrate according to the shape of the patterned metal layer to be a desired shape, a conductive film having a patterned metal layer having a desired shape can be obtained. For example, in a case of being desired to obtain a mesh-shaped metal layer, it is sufficient to form a mesh-shaped plated layer.

In addition, in a case where the steps 3 and 4 are performed using the substrate with a plated layer having a three-dimensional shape, a conductive film having a three-dimensional shape is obtained.

The conductive film (particularly, conductive film having a three-dimensional shape) obtained by the above procedures can be applied to various applications. For example, the conductive film can be applied to various applications such as a touch panel sensor, a semiconductor chip, flexible printed circuits (FPC), a chip on film (COF), a tape automated bonding (TAB), an antenna, a multilayer wiring board, and a motherboard. Among these, it is preferable to use the conductive film for a touch panel sensor (particularly, electrostatic capacitance touch panel sensor). In a case where the conductive film is applied to a touch panel sensor, the patterned metal layer functions as a detection electrode or a lead-out wiring in the touch panel sensor. Such a touch panel sensor can be suitably applied to a touch panel.

In addition, the conductive film can also be used as a heating element. For example, by applying an electric current to the patterned metal layer, the temperature of the patterned metal layer rises, and the patterned metal layer functions as a heat wire.

In the three-dimensional shape portion of the conductive film having a three-dimensional shape, the wiring pattern is deformed and the substrate is thinner than before the molding. As a result, in a case where a conductive film, which has a patterned metal layer on both surfaces and has a three-dimensional shape, is used as a touch panel sensor, the $\Delta Cm$ value of a portion where the area of the patterned metal layer which is the wiring pattern is enlarged is smaller, and the $\Delta Cm$ value of a portion where the substrate is thinner is larger.

Therefore, in the present invention, the above problems can be handled by individually setting the range of $\Delta Cm$ for each address.

In addition, other than the above method, a method of, in consideration of the degree of deformation of the patterned metal layer in a case of molding, adjusting the disposing position of the patterned metal layer in a state before molding so that the $\Delta Cm$ value after molding is substantially constant in the plane is also exemplified.

Furthermore, by changing the thickness of a cover film overlapped on the patterned metal layer in the conductive film having a three-dimensional shape, it is also possible to set the ΔCm value substantially constant in the plane.

These methods can also be used in combination.

In order to increase self-supporting property of the conductive film having a three-dimensional shape, an insert molding may be used. For example, a resin layer may be laminated on the conductive film by placing the conductive film having a three-dimensional shape in a mold and filling the mold with a resin. In addition, a conductive film having excellent self-supporting property may be produced by applying a three-dimensional shape to a substrate with a plated layer before performing a plating treatment, placing the substrate with a plated layer having a three-dimensional shape in a mold, filling the mold with a resin, and subjecting the obtained laminate to the plating treatment.

In addition, in a case of decorating the conductive film having a three-dimensional shape, for example, a decorative film may be attached to the conductive film having a three-dimensional shape while molding the decorative film. Specifically, a three dimension overlay method (TOM) molding can be used.

In addition, the conductive film having a three-dimensional shape may be directly coated to be decorated.

In addition, a decorative layer may be disposed on a front surface and/or a back surface of the substrate before forming the plated layer precursor layer. In addition, in a case where the plated layer precursor layer is disposed on one surface of the substrate, a decorative layer may be formed on the other surface of the substrate, or a decorative film may be attached to the other surface of the substrate.

Furthermore, the conductive film having a three-dimensional shape may be decorated by an in-mold forming or an insert molding using a decorative film.

As one aspect of the method for producing the conductive film according to the embodiment of the present invention, a step (corresponding to the exposure treatment (light irradiation treatment) in "Step 2") of exposing the above-described precursor film to light, a step (corresponding to the development treatment in "Step 2") of developing the exposed film, a step (corresponding to the treatment of deforming the substrate with a plated layer after "Step 2") of molding the developed film, and a step (corresponding to "Step 3" and "Step 4") of plating the molded film may be included.

EXAMPLES

Hereinafter, the present invention will be described more specifically with reference to Examples, but the scope of the present invention is not limited to Examples.

Example 1

1. Preparation of Composition for Forming Plated Layer 30 parts by mass of a polybutadiene maleic acid (butadiene-maleic acid copolymer; hereinafter, sometimes abbreviated as "BMA") (manufactured by Wako Pure Chemical Corporation; 42% by mass aqueous solution) as the net amount of BMA, 20 parts by mass of a bifunctional acrylamide monomer (compound represented by Formula (AA)) synthesized according to paragraph 0187 of Kokai Giho (Journal of Technical Disclosure) 2013-502632, and 50 parts by mass of β-carboxyethyl acrylate (hereinafter, sometimes abbreviated as "βCEA") (manufactured by DAICEL-ALLNEX LTD.; compound represented by Formula (101), average value of n is 1) were mixed, thereby preparing a composition for forming a plated layer (hereinafter, sometimes referred to as a "composition 1 for forming a plated layer"). Composition and δHSP (which refers to an "absolute value of the difference between the Hansen solubility parameter of the monofunctional monomer and the Hansen solubility parameter of the polymerizable polymer"; the same applies hereinafter) of the composition 1 for forming a plated layer are shown in the corresponding columns of Table 1.

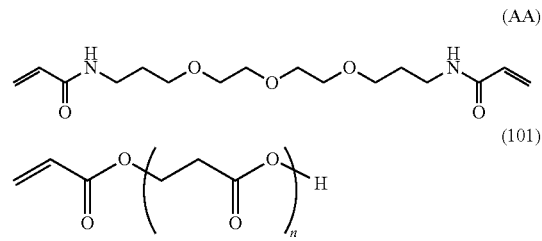

Here, in Formula (101), the average value of n is 1.

2. Production of Precursor Film

A substrate (polycarbonate (PC) film manufactured by TEIJIN LIMITED., Panlite PC, thickness: 125 μm) was coated with Aica Aitron Z-913-3 (manufactured by Aica Kogyo Co., Ltd.) such that a primer layer having a thickness of 0.8 μm was formed on the substrate, and then the obtained coating film was irradiated with ultraviolet rays (UV) to cure the coating film and form a primer layer.

Next, the primer layer was coated with the composition 1 for forming a plated layer such that a plated layer precursor layer having a thickness of 0.9 μm was formed on the obtained primer layer, thereby producing a precursor film (also referred to as a "substrate with a plated layer precursor layer").

3. Various Evaluations (1) Evaluation of Stretchability

Using the produced substrate with a plated layer precursor layer, the plated layer precursor layer was exposed (0.2 J) with a metal halide light source through a quartz mask having a predetermined opening pattern such that a plated layer having a pattern shape of 50 gm lines and spaces was formed.

After the exposure, the exposed plated layer precursor layer was shower-washed with water at room temperature and subjected to a development treatment to produce a substrate (substrate with a patterned plated layer) having the plated layer on which the pattern shape of 50 μm lines and spaces was formed.

The substrate with a patterned plated layer was stretched 200% by vacuum molding, and the presence or absence of disconnection of the lines was confirmed by an optical microscope.

Stretchability was evaluated according to the following criteria. The evaluation results are shown in the column of "Stretchability" in Table 1.

"A": line was disconnected.

"B": line was not disconnected.

(2) Evaluation of Exposure Sensitivity

Using a 15 m×100 mm step wedge (one step size: 15 mm×5 mm) in which optical density of 0 to 2 was divided into 20 steps in 0.1 steps, the produced substrate with a plated layer precursor layer was exposed such that the irradiation energy dose was 0.02 to 2 J/cm$^2$.

After the exposure, the exposed plated layer precursor layer was shower-washed with water at room temperature and subjected to a development treatment to produce a substrate with a plated layer.

The thickness of the plated layer in the produced substrate with a plated layer was measured for each step, a graph in which the horizontal axis indicated the exposure dose and the vertical axis indicated the film thickness of the plated layer was prepared, and the sensitivity (energy amount per unit area; unit: mJ/cm$^2$) was obtained from the energy irradiation dose at which a significant film thickness was obtained by the curing reaction. The results are shown in the column of "Sensitivity" in Table 1.

(3) Evaluation of Platability

Using the produced substrate with a plated layer precursor layer, the plated layer precursor layer was exposed (0.2 J) with a metal halide light source through a quartz mask having a predetermined opening pattern such that a mesh pattern having 5 μm fine lines was formed.

After the exposure, the exposed plated layer precursor layer was shower-washed with water at room temperature and subjected to a development treatment to produce a substrate (substrate with a patterned plated layer) having a plated layer on which the mesh pattern having 5 μm fine lines was formed.

The substrate with a patterned plated layer was stretched 200% by vacuum molding.

Next, the stretched substrate with a patterned plated layer was immersed in a 1% by mass sodium carbonate aqueous solution at normal temperature for 5 minutes, and the taken out substrate with a plated layer was washed twice with pure water. After immersing in pure water for 5 minutes, the substrate with a plated layer was immersed in a Pd catalyst-applying solution (Omnishield 1573 activator, manufactured by Rohm and Haas Company) at 30° C. for 5 minutes, and then the taken out substrate with a plated layer was washed twice with pure water. Next, the obtained substrate with a plated layer was immersed in a reducing solution (Circuposit P13 oxide converter 60 C, manufactured by Rohm and Haas Company) at 30° C. for 5 minutes, and then the taken out substrate with a plated layer was washed twice with pure water. Next, the obtained substrate with a plated layer was immersed in an electroless plating solution (Circuposit 4500, manufactured by Rohm and Haas Company) at 45° C. for 15 minutes, and then the taken out substrate with a plated layer was washed with pure water to obtain a conductive film having a mesh-shaped metal layer (patterned metal layer).

Ten conductive films were produced and the resistance value of the patterned metal layer was measured.

Platability was evaluated according to the following criteria. The evaluation results are shown in the column of "Platability" in Table 1.

"AA": standard deviation of resistance value was less than 15%.

"A": standard deviation of resistance value was 15% or more and less than 50%.

"B": standard deviation of resistance value was 50% or more.

Example 2

In the same manner as in Example 1, a composition for forming a plated layer (hereinafter, sometimes referred to as a "composition 2 for forming a plated layer") was prepared, and a precursor film (also referred to as a "substrate with a plated layer precursor layer") was produced, except that 4-hydroxybutyl acrylate (hereinafter, sometimes abbreviated as "4HBA") (manufactured by OSAKA ORGANIC CHEMICAL INDUSTRY LTD.; compound represented by Formula (102)) was used instead of KEA. Next, various evaluations were performed in the same manner as in Example 1.

Composition and δHSP of the composition 2 for forming a plated layer, and the results of various evaluations are shown in the corresponding columns of Table 1.

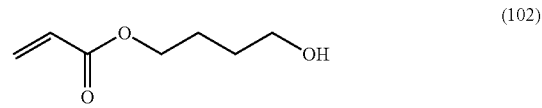

Example 3

In the same manner as in Example 1, a composition for forming a plated layer (hereinafter, sometimes referred to as a "composition 3 for forming a plated layer") was prepared, and a precursor film (also referred to as a "substrate with a plated layer precursor layer") was produced, except that BLEMMER® AE-200 (hereinafter, sometimes abbreviated as "AE200") (manufactured by NOF CORPORATION; compound represented by Formula (103); n≈4.5) was used instead of βCEA.

Composition and δHSP of the composition 3 for forming a plated layer, and the results of various evaluations are shown in the corresponding columns of Table 1.

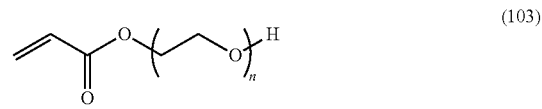

Here, in Formula (103), n≈4.5.

Example 4

In the same manner as in Example 1, a composition for forming a plated layer (hereinafter, sometimes referred to as a "composition 4 for forming a plated layer") was prepared, and a precursor film (also referred to as a "substrate with a plated layer precursor layer") was produced, except that Viscoat #190 (hereinafter, sometimes abbreviated as "#190") (manufactured by OSAKA ORGANIC CHEMICAL INDUSTRY LTD.; compound represented by Formula (104)) was used instead of βCEA.

Composition and δHSP of the composition 4 for forming a plated layer, and the results of various evaluations are shown in the corresponding columns of Table 1.

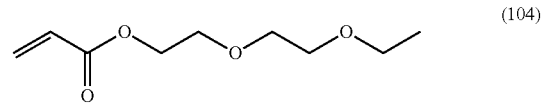

Comparative Example 1

In the same manner as in Example 1, a composition for forming a plated layer (hereinafter, sometimes referred to as a "composition 5 for forming a plated layer") was prepared, and a precursor film (also referred to as a "substrate with a plated layer precursor layer") was produced, except that βCEA was not used.

Composition of the composition 5 for forming a plated layer, and the results of various evaluations are shown in the corresponding columns of Table 1.

Comparative Example 2

In the same manner as in Example 1, a composition for forming a plated layer (hereinafter, sometimes referred to as a "composition 6 for forming a plated layer") was prepared, and a precursor film (also referred to as a "substrate with a plated layer precursor layer") was produced, except that a polyacrylic acid (hereinafter, sometimes abbreviated as "PAA") (Polyacrylic Acid 250,000 manufactured by Wako Pure Chemical Corporation; weight-average molecular weight: 250,000) was used instead of BMA.

Composition and δHSP of the composition 6 for forming a plated layer, and the results of various evaluations are shown in the corresponding columns of Table 1.

TABLE 1

|  |  |  |  | Example | | | | Comparative Example | |
|---|---|---|---|---|---|---|---|---|---|
|  |  |  |  | 1 | 2 | 3 | 4 | 1 | 2 |
| Composition for forming plated layer | Composition [parts by mass] | Polymerizable polymer | BMA | 30 | 30 | 30 | 30 | 60 | — |
|  |  | Non-polymerizable polymer | PAA | — | — | — | — | — | 30 |
|  |  | Polyfunctional monomer | FFM4 | 20 | 20 | 20 | 20 | 40 | 20 |
|  |  | Monofunctional monomer | βCEA | 50 | — | — | — | — | 50 |
|  |  |  | 4HBA | — | 50 | — | — | — | — |
|  |  |  | AE200 | — | — | 50 | — | — | — |
|  |  |  | #190 | — | — | — | 50 | — | — |
| Evaluation | δHSP [MPa$^{0.5}$] |  |  | 3.8 | 4.6 | 6.6 | 10.7 | — | 9.9 |
|  | Stretchability |  |  | A | A | A | A | B | A |
|  | Sensitivity [mJ/cm$^2$] |  |  | 100 | 100 | 100 | 100 | 100 | 300 |
|  | Platability |  |  | AA | AA | A | A | B | A |

Explanation of Results

In Examples 1 to 4, the evaluations of both the stretchability and the sensitivity were good. That is, in Examples 1 to 4, it was possible to provide a precursor film for producing a conductive film, in which the sensitivity of a plated layer precursor layer is good, less energy is required for curing, and stretchability of a plated layer obtained by curing a plated layer precursor layer is excellent.

In Comparative Example 1 (Example of the invention described in WO2018/034291A), stretchability and platability were inferior to those of Examples 1 to 4.

In Comparative Example 2 (Example of the invention described in WO2016/159136A), the sensitivity was inferior to that of Examples 1 to 4.

In addition, comparing Examples 1 and 2 with Examples 3 and 4, platability of Examples 1 and 2, in which δHSP was 6.0 MPa$^{0.5}$ or less, was more excellent.

EXPLANATION OF REFERENCES

10: substrate
12: mesh-shaped plated layer
14: opening portion
20: substrate with plated layer having hemispherical shape W: line width of fine line portion
L: length of one side of opening portion

What is claimed is:

1. A precursor film for producing a conductive film, the precursor film comprising:
   a substrate; and
   a plated layer precursor layer disposed on the substrate,
   wherein the plated layer precursor layer includes at least one polyfunctional monomer selected from the group consisting of a polyfunctional acrylamide monomer and a polyfunctional methacrylamide monomer, a monofunctional monomer, and a polymer which has a functional group interacting with a plating catalyst or a precursor of the plating catalyst and has a polymerizable functional group, and
   wherein the polymer which has a functional group interacting with a plating catalyst or a precursor of the plating catalyst and has a polymerizable functional group is a polymer having a repeating unit derived from a conjugated diene compound and a repeating unit derived from an unsaturated carboxylic acid or a derivative of the unsaturated carboxylic acid.

2. The precursor film according to claim 1,
   wherein an absolute value of a difference between a Hansen solubility parameter of the monofunctional monomer and a Hansen solubility parameter of the polymer which has a functional group interacting with a plating catalyst or a precursor of the plating catalyst and has a polymerizable functional group is 6.0 MPa$^{0.5}$ or less.

3. The precursor film according to claim 1,
   wherein the monofunctional monomer has a functional group which interacts with a plating catalyst or a precursor of the plating catalyst.

4. The precursor film according to claim 1,
   wherein the polyfunctional monomer is a compound represented by Formula (100),

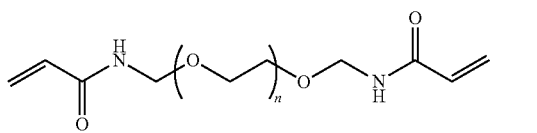

(100)

here, in Formula (100), n is an integer of 1 or more.

5. The precursor film according to claim 1, further comprising:
a primer layer between the substrate and the plated layer precursor layer.

6. The precursor film according to claim 1, further comprising:
a protective film disposed on the plated layer precursor layer.

7. A substrate with a plated layer comprising:
a plated layer obtained by curing the plated layer precursor layer in the precursor film according to claim 1.

8. The substrate with a plated layer according to claim 7, wherein the plated layer is disposed in a pattern shape.

9. The substrate with a plated layer according to claim 7, wherein the substrate has a three-dimensional shape.

10. A conductive film comprising:
the substrate with a plated layer according to claim 7; and
a metal layer disposed on the plated layer in the substrate with a plated layer.

11. A touch panel sensor comprising:
the conductive film according to claim 10.

12. A touch panel comprising:
the touch panel sensor according to claim 11.

13. A method for producing a conductive film, the method comprising:
a step of exposing the precursor film according to claim 1 to light;
a step of developing the exposed film;
a step of molding the developed film; and
a step of plating the molded film.

* * * * *